United States Patent [19]

Fiscella et al.

[11] Patent Number: 5,140,341
[45] Date of Patent: Aug. 18, 1992

[54] METHOD AND APPARATUS FOR THERMALLY PRINTING LARGE IMAGES WITH SMALL DYE-DONOR PATCHES

[75] Inventors: Marcello D. Fiscella, Fairport; Stanley W. Stephenson, Spencerport, both of N.Y.

[73] Assignee: Eastman Kodak Company, Rochester, N.Y.

[21] Appl. No.: 716,563

[22] Filed: Jun. 17, 1991

[51] Int. Cl.$^5$ .......................... G01D 9/00; B41M 5/26; B41M 5/34; B41J 2/325
[52] U.S. Cl. ............................. 346/1.1; 346/76 PH; 400/120; 400/240.3
[58] Field of Search .................. 346/76 ph, 1.1; 400/120 MP, 240.3

[56] References Cited

U.S. PATENT DOCUMENTS

| | | | |
|---|---|---|---|
| 4,710,783 | 12/1987 | Caine et al. | 346/76 ph |
| 4,745,413 | 5/1988 | Brownstein et al. | 346/76 ph |
| 4,884,080 | 11/1989 | Hirahara et al. | 346/46 |
| 4,977,410 | 12/1990 | Onuki et al. | 346/76 |

FOREIGN PATENT DOCUMENTS

| | | | |
|---|---|---|---|
| 0064867 | 4/1985 | Japan | 400/240.3 |
| 262679 | 12/1985 | Japan | 400/120 MP |
| 239968 | 10/1986 | Japan | 400/240.3 |
| 011385 | 1/1988 | Japan | 400/120 MP |

*Primary Examiner*—Benjamin R. Fuller
*Assistant Examiner*—Huan Tran
*Attorney, Agent, or Firm*—Raymond L. Owens

[57] ABSTRACT

A thermal printer uses a relatively small dye-donor patches to produce images which are larger than the dye-donor patches. An image is formed by printing and merging of multiple sub-images. Each of the sub-images is smaller than one of the dye-donor patches. Merging of the sub-images is performed by generating data fields for sub-images and then distributing image data throughout overlapping segments of the sub-image data fields. A distribution of a portion of the image data is made in a first overlapping segment in a first pattern that is substantially non-linear. A second distribution of remaining image data is made in a second overlapping segment in a pattern that is complementary to the first pattern. When the overlapping segment are brought together, a merger zone between the sub-images becomes virtually undetectable to an unaided human eye.

9 Claims, 3 Drawing Sheets

METHOD AND APPARATUS FOR THERMALLY PRINTING LARGE IMAGES WITH SMALL DYE-DONOR PATCHES

CROSS REFERENCE TO RELATED PATENT APPLICATIONS

The present invention is related to a co-pending U.S. patent application Ser. No. 7/717577, entitled "Method and Apparatus for Printing an Image in Multiple Sub-Images", having a common assignee, common inventorship, and being filed concurrently with the present patent application.

FIELD OF THE INVENTION

The present invention relates generally to thermally printing images on receivers in multiple sub-images, and more particularly, to printing relatively large images with relatively small dye-donor patches.

BACKGROUND OF THE INVENTION

In the field of printing of images, there often arises a need to produce an image on relatively large receivers. Printing of images on large receivers presents various problems. The nature of the problems is often a function of the type of printing being performed. For example, in the case of thermal printing, there is a practical limitation on the size of a thermal printing head. When an image is to be formed on a receiver that is wider than a thermal printing head, a multiple head printing machine is typically used. Two or more printing heads are used to produce overlapping sub-images. The printing heads are coordinated with each other so that each head produces only a portion of the image in an overlapping region The coordination of the printing heads is a difficult and complex task. See, for example U.S. Pat. No. 4,977,410 (H. Onuki et al.), issued Dec. 11, 1990. If not done properly, the overlapping region of the image has objectionable distortions.

Even when great care is used to coordinate the operation of the multiple printing heads, there is still a visually discernible discontinuity formed in the image at boundaries of the overlapping region of the image Another problem arises when it is desired to produce large images by thermal printing There is a practical limit on the size of a dye-donor film segment that can be used to provide dye for the image. Heretofore, image size has been limited to the size of a dye-donor film patch used to produce the image.

Dye-donor films must be produced with an extremely uniform coating of dye on a carrier film. In order to achieve this high level of uniformity, the dye-donor film is typically produced on a high precision gravuring press. In a gravuring press, the carrier film is coated with repeating sets of dye patches of various colors. Typically, a first gravuring roller coats the carrier film with a patch of yellow dye. A second gravuring roller coats the carrier film with a patch of magenta dye. A third gravuring roller coats the carrier film with a patch of cyan dye. In some instances, a set of patches will include a black dye patch and possibly a special clear overcoat patch or a white undercoat patch. Each of the patches has a limited length that is dictated by the circumference of the gravuring rollers and the number of patches produced in each set. For example, assume that it is desired to make a three color dye patch set with a gravuring press having rollers with a 36 inch circumference. The 36 inch circumference will need to be divided into three segments with a maximum circumferential length of 12 inches. Thus each dye patch produced by such a roller has a maximum length of 12 inches.

In order to produce patches which are longer, larger rollers are required. This requires that a gravuring press must be built especially for the longer length. High precision gravuring presses are extremely complex and expensive to build. A typical high precision gravuring press may cost as much as $100 million. Therefore, as a practical matter, prior art thermal printers are limited to using dye-donor films with patches that are no longer than those available from presently available gravuring presses.

It has heretofore not been possible to produce a thermally printed image that is longer than a patch of dye on the dye-donor film being used to produce the image. Because of limitations dictated by presently available gravuring presses, there has been a practical limitation on the length of an image that is producible in a thermal printing operation.

It is desirable therefore to produce large images that are free of visually discernible distortions and which can be produced with dye-donor films that are generated on presently available gravuring presses.

SUMMARY OF THE INVENTION

The present invention is directed to a method and apparatus for thermally printing an image having a desired length on a receiver using a set of dye-donor patches with each patch having a length less than the desired length of the image. The thermal printing is performed in multiple steps in which a first set of dye patches is used to produce a first sub-image on a first region of the receiver and then a second set of dye patches is used to produce a second sub-image on a second region of the receiver The sub-images combine to produce the desired image on the receiver.

Viewed form one aspect, the present invention is directed to a method of thermally printing a desired image on a receiver. The method comprises the steps of printing a first sub-image on a first region of the receiver with a first dye-donor patch having a length that is less than a length of the receiver and printing a second sub-image on a second region of the receiver with a second dye-donor patch having a length that is less than the length of the receiver. The first and second sub-images are aligned such that, after being printed, the sub-images form the desired image on the receiver.

Viewed from another aspect, the present invention is directed to a method of thermally printing a desired image on a receiver. The method comprises the steps of positioning a first dye-donor patch adjacent a first region of the receiver, passing the first dye-donor patch and the adjacent first region of the receiver across a thermal printing head to produce a first sub-image on the first region of the receiver, positioning a second dye-donor patch adjacent a second region of the receiver, and passing the second dye-donor patch and the adjacent second region of the receiver across the thermal printing head to produce a second sub-image on the second region of the receiver. The second sub-image is a complement to the first sub-image so that the first and second sub-images combine to produce the desired image on the receiver.

Viewed from yet another aspect, the present invention is directed to an apparatus for thermally printing a desired image on a receiver. The apparatus comprises means for printing a first sub-image on a first region of the receiver with a first dye-donor patch having a length that is less than a length of the receiver, and means for printing a second sub-image on a second region of the receiver with a second dye-donor patch having a length that is less than the length of the receiver. The first and second sub-images are aligned such that, after being printed, the sub-images form the desired image on the receiver.

Viewed from still another aspect, the present invention is directed to an apparatus for thermally printing a desired image on a receiver. The apparatus comprises means for positioning a first dye-donor patch adjacent a first region of the receiver, means for passing the first dye-donor patch and the adjacent first region of the receiver across a thermal printing head to produce a first sub-image on the first region of the receiver, means for positioning a second dye-donor patch adjacent a second region of the receiver, and means for passing the second dye-donor patch and the adjacent second region of the receiver across the thermal printing head to produce a second sub-image on the second region of the receiver. The second sub-image is a complement to the first sub-image so that the first and second sub-images combine to produce the desired image on the receiver.

The invention will be better understood from the following detailed description taken in consideration with the accompanying drawings and claims.

The drawings are not necessarily to scale.

DETAILED DESCRIPTION

Figure 1:
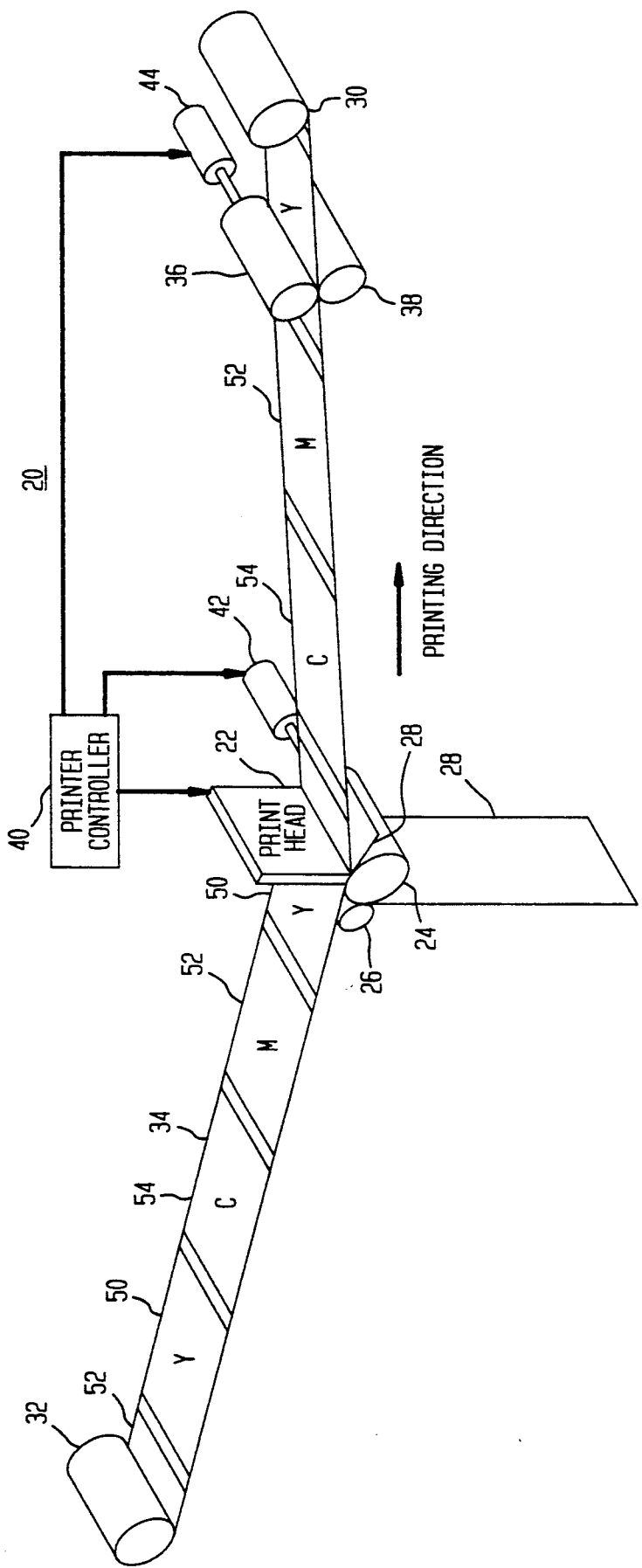
FIG. 1 is a schematic view of a thermal printer in accordance with the present invention.

Referring now to FIG. 1, there is shown a schematic representation of a full-color (typically a three color) thermal printer 20 which operates in accordance with the present invention. Certain features of the thermal printer 20 are disclosed and claimed in a co-pending U.S. Patent Application entitled "Method and Apparatus for Thermally Printing Large Images with Small Dye-Donor Patches", described in the Related Patent Applications section hereinabove. The thermal printer 20 comprises a print head 22, a transport platen 24 and a clamping roller 26 for transporting a receiver (printing media) 28, a take-up spool 30, and a supply spool 32 for a dye-donor film 34, a drive roller 36 and a clamping roller 38 for the dye-donor film 34, a printer controller 40, and first and second motors 42 and 44, respectively. The motor 42 is a conventional stepper motor and the motor 44 is a conventional controlled torque motor. The dye-donor film 34 is comprised of a repeating series of dye patches coated on a clear film of polyethylene terepthalate. A first color dye patch 50 is yellow (y), a second color dye patch 52 is magenta (m), and a third color dye patch 54 is cyan (c).

The printer controller 40 is coupled by first, second and third outputs to the motors 42 and 44 and to the print head 22, respectively. The motor 42 rotates the transport platen 24 to advance the receiver 28. The motor 44 rotates the drive roller 36 to advance the dye-donor film 34

In operation the thermal printer 20 functions under the direction of the printer controller 40. The printer controller 40 is a microprocessor-based control system of the type described in U.S. Pat. No. 4,745,413 (Scott Brownstein et al.) and U.S. Pat. No. 4,710,783 (Holden Caine et al.) which are incorporated herein by reference. The printer controller 40 receives an image data signal from a conventional computer image source (not shown) and generates instructions for the print head 22 in response to the image data. Additionally, the printer controller 40 receives signals from various conventional detectors (not shown) in the thermal printer 20 which provide routine administrative information, such as a position of the receiver 28, a position of the dye-donor film 34, and a beginning and end of a print cycle, etc. The printer controller 40 generates operating signals for the motors 42 and 44 in response to said information.

The print head 22 performs a printing operation by selectively heating and thereby transferring spots of dye from the dye-donor film 34 onto the receiver 28. This system of dye deposition thermal printing is well known in the prior art and is described in detail in the previously mentioned U.S. Pat. Nos. 4,710,783 and 4,745,413. The creation of a full color image requires the deposition of three separate images superimposed on each other, using yellow, cyan and magenta dyes successively Referring now to FIG. 2, there is shown a receiver 28 and a portion of the dye-donor film 34 in a series of schematic relative positions that illustrate certain features of the thermal printer 20 of FIG. 1 which operate in accordance with the present invention The portion of the dye-donor film 34 is shown in a series of positions, Position A through Position F, with each position illustrating how the dye-donor film 34 is oriented relative to the receiver 28 in order to produce a particular portion of a desired image.

Figure 2:
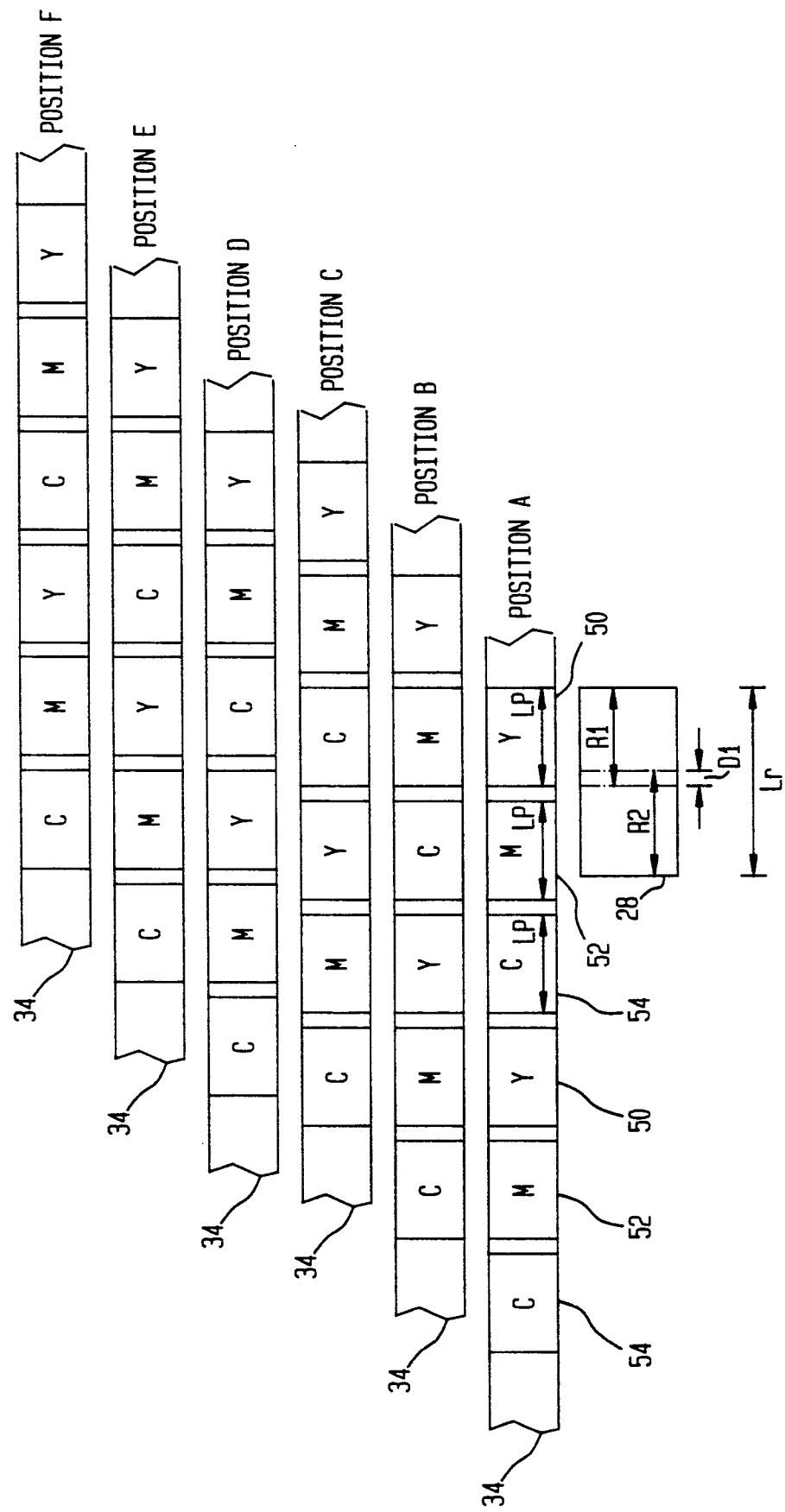
FIG. 2 is a symbolic representation of a receiver for an image and a series of positions of a portion of a dye-donor film used to produce an image thereon in accordance with the present invention.

The dye patches 50, 52 and 54 are coated onto the dye-donor film 34 in a gravuring process that produces the dye patches with a length Lp that is limited by the gravuring process. The film 34 comprises a repeating sequence of yellow, magenta and cyan dye patches 50, 52 and 54, respectively which are each separated by a non-color portion of film 34. With presently available gravuring presses, each of the dye patches 50, 52 and 54 is about twelve inches long. When the thermal printer 20 of FIG. 1 is used to produce images on 8×10 inch or 8.5×11 inch paper, a twelve inch dye patch length is sufficient. However, there are times when it is desired to use the thermal printer 20 to produce images on receivers which are longer than twelve inches. For example, an industry standard B size print is 12×17 inches. Such a situation is illustrated in FIG. 2.

The receiver 28 has a length Lr that is greater than the length Lp of the dye patches 50, 52 and 54 on the dye-donor film 34. The receiver 28 is comprised of two overlapping regions R1 and R2 separated by dashed lines. Each of the regions R1 and R2 has a length that is no longer than the length Lp of one of the dye patches 50, 52 and 54. The regions R1 and R2 are shown overlapping by a distance D1.

In a typical print cycle, the printer controller 40 of FIG. 1 first directs the motor 42 of FIG. 1 to advance the receiver 28 to a starting location. Typically, this starting location is determined as a point where a conventional sensor (not shown) senses a blocking of light from a light source (not shown) by presence of a leading edge of the receiver 28. The motor 42 then advances the receiver 28 a predetermined number of steps beyond the starting location. The motor 44 of FIG. 1 advances the dye-donor film 34 so that a leading edge of a first one of the yellow dye patches 50 is positioned adjacent a leading edge of the receiver 28 (shown schematically as Position A in FIG. 2). Then a first line of printing begins The printing takes place on a line-by-line basis with the motor 42 advancing the receiver 28 and the dye-donor film 34 a predetermined incremental distance between successive lines of printing.

The motor 42 incrementally advances the receiver 28 and the dye-donor film 34 throughout the generation of a first color (yellow) image on the first region R1 of the receiver 28. A constant tension is maintained on the dye-donor film 34 by the rollers 36 and 38 and the motor 44. At the completion of the first color image, the motor 42 reverses and rotates the transport platen 24 in a counter-clockwise direction until the leading edge of the receiver 28 has been withdrawn beyond the starting position. The motor 42 is then driven in the forward or clockwise direction until the leading edge of the receiver 28 is advanced to a position where printing of a second color image is to begin. The motor 44 advances the dye-donor film 34 so that a leading edge of a first one of the magenta dye patches 52 is positioned adjacent the leading edge of the receiver 28 (Position B). The printing is repeated to place a second color (magenta) image onto the first region R1 of the receiver 28. Similarly, a third color (cyan) image is printed onto the first region R1 of the receiver 28.

At the completion of printing of the three image colors (yellow, magenta and cyan), a first full-color composite sub-image (first sub-image) has been produced on the first region R1 of the receiver 28.

After the first sub-image is formed, the leading edge of the receiver 28 is returned to the starting position The receiver 28 is then advanced so that a leading edge of the region R2 of the receiver 28 is aligned with the print head 22. Then a leading edge of a second one of the yellow dye patches 50 is advanced to the print head 22. The relative position of the receiver 28 and the dye-donor film 4 at this point is shown in Position D.

Printing of a first color (yellow) of a second sub-image then begins In a preferred embodiment of the thermal printer 20, the printing of the second sub-image begins in a region of the receiver 28 on which a partially complete segment of the first sub-image is already formed. In other words, there is an overlapping of segments of the first and second sub-images on a portion of the receiver 28 where the regions R1 and R2 overlap.

This process is repeated for each of the two remaining colors, magenta and cyan (see Positions E and F). After deposition of images for the three colors of dye onto the second sub-image, a complete image is present on the receiver 28.

In order to produce an image that is not visually objectionable, it is necessary to accurately align the first and second sub-images. As a practical matter there is typically some minor but finite misalignment between the sub-images, typically 20 to 160 microns for an industry standard B size image In some high resolution printing applications, such minor misalignments are visible to an unaided human eye.

In a preferred embodiment of the thermal printer 20 of FIG. 1, the print head 22 produces an image with a resolution of about 300 dots per inch or 12 dots per millimeter. In other words, the image produced by the thermal printer 20 can be described as being comprised of pixels with a pitch of about 12 pixels per millimeter. In a typical multicolored image of this resolution, an unaided human eye does not readily detect an absence or misplacement of an occasional one of the pixels However, an unaided human eye will detect if a series of pixels are missing or misplaced if the misplacement has a substantially linear alignment. Thus if two sub-images are joined at a line, a misalignment between the sub-images is visible to an unaided eye.

Consequently, it has been found desirable to merge sub-images in a relatively long overlap segment The visibility of an overlap segment of the two sub-images decreases as the length of the overlap segment increases. Thus, it is ideal to merge the two sub-images across as large a segment as possible. For example, if twelve inch long dye patches are used to produce a seventeen inch long image, an overlap segment could be up to 7 inches in length.

In a preferred embodiment of the thermal printer 20, each of the sub-images is made partially complete in a segment of the receiver 28 where the regions R1 and R2 overlap in accordance with a method which is disclosed and claimed in a co-pending U.S. Patent Application entitled "Method and Apparatus for Printing an Image in Multiple Sub-Images", described in the Related Patent Applications section hereinabove.

Distribution of the image into two or more sub-images is performed within a conventional microprocessor of the printer controller 40. The microprocessor is programmed so that it separates incoming image (data from the image data source) into data for separate sub-images. The image data for the sub-images is stored in conventional look-up tables as data fields.

Figure 3:
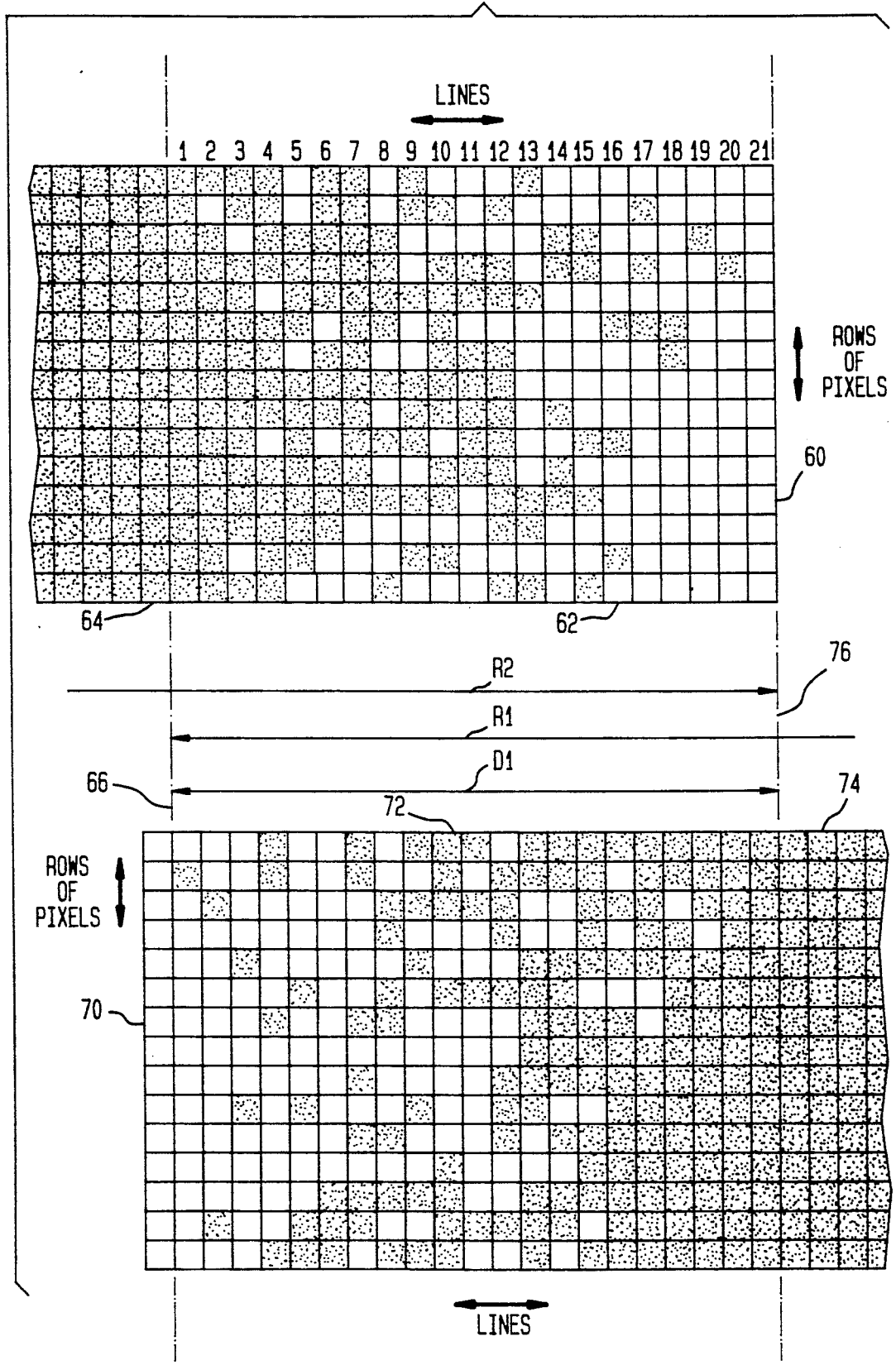
FIG. 3 is a schematic view of a data field superimposed on a symbolic re of the receiver of FIG. 2 illustrating a aspect of the thermal printer of FIG. 1.

Referring now to FIG. 3, there is shown a symbolic representation of data fields 60 and 70 for two sub-images. Each of the data fields 60 and 70 are comprised of lines and rows of pixels. Data field 60 also comprises an overlap segment 62 and a non-overlap segment 64. Data field 70 also comprises an overlap segment 72 and a non-overlap segment 74. The segments 62 and 72 overlap a distance D1. The distance D1 in FIG. 3 is shown equal to a length of 21 lines of pixels.

Each of data fields 60 and 70 is shown symbolically, for purposes of clarity, with a width of only fifteen rows. In an actual embodiment, the data fields 60 and 70 have a width of thousands of rows. Each intersection of a row and line corresponds to a pixel in the data fields 60 and 70 and is identifiable with a particular location on the receiver 28 of FIG. 2. Boundary lines 66 and 76 are shown symbolically as being coincident with boundaries of the regions R1 and R2 of the receiver 28 of FIG. 2, respectively.

The printer controller 40 treats data for each of the sub-images as two blocks of data. A first block of data of each sub-image is assigned to each of the non-overlap segments 64 and 74 of the data fields 60 and 70, respectively. A second block of data for each of the sub-images is distributed across both of the overlap segments 62 and 72 of the data fields 60 and 70, respectively Each of the overlap segments 62 and 72 are assigned 50% of the second block of data. The distribution of the second block of data is done in accordance with a distribution scheme that takes account of a position of an element of image data relative to the boundary lines 66 and 76.

Shaded areas of each of the data fields 60 and 70 symbolically represent the areas of those data fields into which the printer controller 40 has assigned image data. Unshaded or blank areas represent areas where no image data has been assigned.

FIG. 3 shows each of the lines of the data field 60 to the right of the boundary line 66 having an assigned number, beginning with 1 and ending with 21. Image data is assigned to each of the rows of a line with a probability that varies as a function of a distance of the line from the boundary line 66. For example, each row of line 1 has a probability of 100% of containing image data. Thus all of the rows of line 1 are shown shaded. Each row of line 3 has a probability of 90% of containing image data. Thus two of the rows of line 3 are shown blank. Similarly, each of the successive lines of the data field 60 has an increasing number of its rows shown blank. Finally at line 21, all of the rows are shown blank. This is representative of a 0% probability of image data being assigned to one of the rows of line 21. The printer controller 40 selects, at random, which rows of a particular line are to be left blank.

Locations for the image data assigned to the overlap segment 62 of the data field 60 are stored as a look-up table in the printer controller 40. The remainder of the second block of image data is then assigned to the overlap segment 72 of the data field 70 in a complementary manner. In other words, image data is placed into all locations in data field 70 that correspond to blank areas of the data field 60.

Blank areas of the overlap segment 62 align or interweave with those areas of the overlap segment 72 which are assigned image data (i.e., complete areas). When sub-images are formed from the data in the data fields 60 and 70, all of the locations on the receiver 28 are provided with corresponding image data.

It can be recognized that the preferred method of assigning image data to overlapping segments of an image requires substantial look-up table capacity and processing capability in the printer controller 40. In order to maintain a practical limit on the processing requirements of the printer controller 40, it is desirable to select a practical limit for the size of the overlapping segments. In the context of a printing resolution of 300 pixels per inch, it has been found that an overlap segment that is about 20 to 30 lines in length is sufficient to provide a substantially invisible merger zone for the two sub-images.

In an alternative method to that described above, the image data is distributed randomly throughout the data field 60. The data field 70 is then made to conform a complement of the randomly generated data field 60.

It is to appreciated and understood that the specific embodiments of the invention are merely illustrative of the general principles of the invention. Various modifications may be made by those skilled in the art which are consistent with the principles set forth. For example, even if future gravuring presses are built to produce longer dye patches, the present invention will still be useful to produce images larger than any dye patch that is producible by a future gravuring press.

What is claimed is:

1. A method of thermally printing a desired image on a receiver comprising the steps of:

printing a first sub-image on a first region of the receiver with a first dye-donor patch having a length that is less than a length of the receiver;

printing a second sub-image on a second region of the receiver with a second dye-donor patch having a length that is less than the length of the receiver;

the first and second regions of the receiver are overlapped; and the first and second sub-images being aligned such that, after being printed, the sub-images form the desired images on the receiver.

2. The method of claim 1 wherein:

the first sub-image having a complete segment and having a partially complete segment which has complete areas and blank areas, the partially complete segment of the first sub-image having its complete areas distributed throughout the segment in a substantially non-linear pattern; and the second sub-image having a complete segment and having a partially complete segment, the partially complete segment of the second sub-image having its complete areas distributed throughout the segment in a pattern that is complementary to the pattern of complete areas of the partially complete segment of the first sub-image, and the partially complete segments of the first and second sub-images overlapping each other so that the sub-images combine to produce a complete image.

3. A method of thermally printing a desired image on a receiver comprising the steps of:

printing a first sub-image on a first region of the receiver with a first set of dye-donor patches, each of said patches having a length that is less than a length of the receiver;

printing a second sub-image on a second region of the receiver with a second set of dye-donor patches, each of said patches having a length that is less than the length of the receiver;

the first and second regions of the receiver are overlapped; and the first and second sub-images being aligned such that, after being printed, the sub-images form the desired image on the receiver.

4. The method of claim 3 wherein:

the first sub-image having a complete segment and having a partially complete segment which has complete areas and blank areas, the partially complete segment of the first sub-image having its complete areas distributed throughout the segment in a substantially non-linear pattern; and the second sub-image has a complete and a partially complete segment, the partially complete segment of the second sub-image having its complete areas distributed throughout the segment in a pattern that is complementary to the pattern of complete areas of the partially complete segment of the first sub-image, and the partially complete segments of the first and second sub-images overlapping each other so that the sub-images combine to produce a complete image.

5. A method of thermally printing a desired image on a receiver comprising the steps of:

positioning a first dye-donor patch adjacent to a first region of the receiver;

passing the first dye-donor patch and the adjacent first region of the receiver across a thermal printing head to produce a first sub-image on the first region of the receiver;

positioning a second dye-donor patch adjacent to a second region of the receiver;

passing the second dye-donor patch and the adjacent second region of the receiver across the thermal printing head to produce a second sub-image on the second region of the receiver; and said second sub-image being a complement to the first sub-image so that the first and second sub-images combine to produce the desired image on the receiver wherein the first and second sub-images are formed in a series of lines with a resolution of about 300 dots per inch, the first and second sub-images having segments which overlap each other, and the overlapping segments are about 20 to 30 lines in length.

6. Apparatus for thermally printing a desired image on a receiver comprising:

means for printing a first sub-image on a first region of the receiver with a first dye-donor patch having a length that is less than a length of the receiver and for printing a second sub-image on a second region of the receiver with a second dye-donor patch having a length that is less than the length of the receiver;

the first and second sub-images being aligned such that, after being printed, the sub-images form the desired image on the receiver; and the first and second regions of the receiver are overlapped.

7. The apparatus of claim 4, wherein:

printing of the first sub-image is performed with a portion of the first sub-image having a segment that is partially complete;

printing of the second sub-image is performed with a portion of the second sub-image having a segment that is partially complete;

the partially complete segments of the first and second sub-images overlapping each other;

the partially complete segment of the first sub-image having blank areas which are distributed throughout the partially complete segment in a first pattern; and the partially complete segment of the second sub-image having complete areas, which complete areas are distributed throughout the partially complete segment in a second pattern that corresponds substantially to the first pattern of blank areas of the partially complete segment of the first sub-image.

8. Apparatus for thermally printing a desired image on a receiver comprising:

means for printing a first sub-image on a first region of the receiver with a first set of dye-donor patches, each of said patches having a length that is less than a length of the receiver and for printing a second sub-image on a second region of the receiver with a second set of dye-donor patches, each of said patches having a length that is less than the length of the receiver; and the first and second sub-images being aligned such that, after being printed, the sub-images form the desired image on the receiver; and the first and second regions of the receiver are overlapped.

9. The apparatus of claim 8 wherein:

printing of the first sub-image is performed with a portion of the first sub-image having a segment that is partially complete;

printing of the second sub-image is performed with a portion of the second sub-image having a segment that is partially complete;

the partially complete segments of the first and second sub-images overlapping each other;

the partially complete segment of the first sub-image having blank areas which are distributed throughout the partially complete segment in a first pattern; and the partially complete segment of the second sub-image having complete areas, which complete areas are distributed throughout the partially complete segment in a second pattern that corresponds substantially to the first pattern of blank areas of the partially complete segment of the first sub-image.

* * * * *